United States Patent
Becker et al.

(10) Patent No.: US 7,091,444 B2
(45) Date of Patent: Aug. 15, 2006

(54) PROCESS FOR LASER BEAM WELDING WITH REDUCED FORMATION OF END CRATERS

(75) Inventors: Wolfgang Becker, Ulm (DE); Markus Beck, Oberelchingen (DE); Klaus Goth, Sindelfingen (DE); Mike Paelmer, Weil der Stadt (DE); Claus-Dieter Reiniger, Remshalden (DE); Daniel Zauner, Ballendorf (DE)

(73) Assignee: DaimlerChrysler AG (DE)

( * ) Notice: Subject to any disclaimer, the term of this patent is extended or adjusted under 35 U.S.C. 154(b) by 36 days.

(21) Appl. No.: 10/790,387

(22) Filed: Mar. 1, 2004

(65) Prior Publication Data

US 2004/0182836 A1    Sep. 23, 2004

(30) Foreign Application Priority Data

Feb. 28, 2003  (DE)  ................................ 103 09 159

(51) Int. Cl.
*B23K 26/24* (2006.01)

(52) U.S. Cl. ........................... 219/121.64; 219/121.61; 219/121.8

(58) Field of Classification Search ........... 219/121.64, 219/121.61, 121.62, 121.8
See application file for complete search history.

(56) References Cited

U.S. PATENT DOCUMENTS 4,873,415 A * 10/1989 Johnson et al. ........ 219/121.64

FOREIGN PATENT DOCUMENTS

| DE | 196 27 913 A 1 | 2/1997 | |
|---|---|---|---|
| DE | 196 32 415 A1 | 2/1998 | |
| DE | 197 50 156 A 1 | 5/1999 | |
| DE | 100 27 148 A1 | 12/2001 | |
| DE | 102 29 744 A1 | 1/2004 | |
| JP | 55-114490 A * | 9/1980 | |
| JP | 60 216 987 A | 10/1985 | |
| JP | 3-60883 A * | 3/1991 | ............ 219/121.64 |
| JP | 4-17988 A * | 2/1992 | |
| JP | 4-52096 A * | 2/1992 | |

* cited by examiner

*Primary Examiner*—Geoffrey S. Evans
(74) *Attorney, Agent, or Firm*—Akerman Senterfitt; Stephen A. Pendorf

(57) ABSTRACT

During laser beam welding a so-called end crater forms at the end of the weld seam. The end crater is formed by the volume shrinkage of the solidifying melt after the laser beam reaches the seam end and is switched off or repositioned. The end crater acts as a geometric notch and decreases the mechanical characteristics, in particular the operational stability, of the weld seam so that holes or tears in the area of the end crater can occur. The task of the present invention is thus comprised of providing a process for reducing end crater formation. The task is solved in that towards the seam end the focus of the laser beam is distanced from the surface to be welded and/or a transverse movement of the beam occurs.

16 Claims, 1 Drawing Sheet

PROCESS FOR LASER BEAM WELDING WITH REDUCED FORMATION OF END CRATERS

BACKGROUND OF THE INVENTION

1. Field of Invention

The invention concerns a process for laser beam welding with reduced formation of end craters, according to the precharacterizing portion of Patent Claims 1 and 3. Processes of this general type are already known from DE 196 30 521 A1.

During laser beam welding a so-called end crater forms at the end of the weld seam. The end crater is formed by the volume shrinkage of the solidifying melt after the laser beam reaches the seam end and is switched off or repositioned. The end crater acts as a geometric notch or groove and decreases the mechanical properties, and in particular the operational stability of the weld seam, so that holes or tears in the area of the end crater can occur.

2. Related Art of the Invention

For reducing the formation of end craters, it is taught in DE 196 30 521 A1 to reduce the laser output at the seam end (so-called "power ramp") or to increase the weld speed (so-called "speed ramp").

This procedure reduces the problem slightly, but is however frequently insufficient.

SUMMARY OF THE INVENTION

It is thus the task of the present invention to provide a process for reducing end crater formation.

The invention, with respect to the task of providing a process for laser beam welding with reduced formation of end craters, comprises moving a laser beam along a segment to be welded to form a weld seam having an end, and as the laser beam approaches the seam end, distancing the focus of the laser beam from the surface to be welded, wherein at least one of (a) the welding speed is reduced towards the seam end, and (b) at the seam end a local beam movement occurs sideways beyond the seam.

With respect to the process to be provided, this task is accomplished inventively thereby, that towards the end of the seam the focus of the laser beam is removed or distanced from the surface to be welded. Preferably, the defocusing begins several mm prior to the end of the seam and achieves it maximum at the end of the seam. An earlier arrival at the maximum is however also conceivable.

In contrast to the process according to DE 196 30 521 A1, here the laser output is maintained constant. By the increasing defocusing there occurs however an increasing spreading or widening of the laser processing surface on the surface to be welded, and the larger surface area leads to the formation of a more even or level solidification zone of the melt.

It is also advantageous when additionally, in proximity to the seam end, the weld speed is reduced, and/or at the seam end a local beam movement extending laterally out beyond the seam occurs.

The reducing of the weld speed has the consequence that, despite increased widening of the laser treatment surface, the energy application per surface unit of weld seam per unit of time of laser treatment remains constant or at least is reduced with less speed. Here also, the result is a more even solidification zone of the melt.

The lateral beam movement causes a yet further evening out or leveling of the solidification zone.

A further evening out is achievable by the combination of the two characteristics.

In an alternative embodiment of the inventive process, the process according to DE 196 30 521 A1 is improved in that supplementally to a drop in the laser power or output, one of the three above-mentioned process characteristics or a combination thereof is employed, as a result of which likewise a more even or level solidification zone results.

Particularly preferred lateral beam movements undulate in the manner of a pendulum movement or a recurring spiral, widening the seam beginning at the seam end in the form of a circular movement superimposed transverse to the seam or in the form of a spiral narrowing around the center of the seam end. Therewith an even coverage of a widened seam area is produced, wherefrom likewise a more even or level solidification zone results.

Preferably the defocusing of the laser beam takes place increasing linearly. A slope of this type is very easy to achieve from the control technology aspect, and produces an even widening of the laser beam and therewith an even solidification of the melt. For certain applications and/or materials however other focusing progressions can be advantageous, for example a quadratic, or even exponential, increase of the defocusing.

Preferably the focus at the seam end, that is, the focal point at maximal defocusing, is such a distance from the surface to be processed, that the surface area illuminated by the laser (laser footprint) on the surface being processed while defocused exceeds the surface area when focused by at least 50%, preferably 200%.

The described process steps can in principle occur using a conventional welding device, which for reasons of precision and speed preferably include a robot for guiding the beam.

The inventive process has however proven itself to be particularly advantageous when the laser beam is guided along the surface by means of a scanner device. A scanner device is a particularly rapid and flexible beam deflecting device, for example a mirror system (comprising at least one single- or multi-axial controllable pivotable mirror, see, for example, DE 100 27 148 A1), or however also acoustic-optical modulators.

The greatest advantage is comprised therein, that an easily programmable scanning device can guide the laser beam in very short time interval on almost any processing track over the surface to be processed, and can provide without any problem in particular also precisely defined and coordinated changes of the welding speed or complicated designs or patterns of the lateral beam movement track.

Preferably the length of the seam segment at the seam end, within which the power, the speed or the focus is to be varied or the lateral beam movement occurs, is 2 to 5 mm, preferably 3 mm.

The laser output is reduced within the terminal seam segment preferably from 2000–1500 Watt, in particular 1700 Watt, to 500–0 Watt, in particular to 300 Watt.

The seam terminal segment is traversed preferably within 50 to 100 ms, in particular within 70 ms.

The lateral extent of the beam movement laterally to the welding seam is preferably 1 to 5 mm, in particular 2 mm, to each side.

When observing the last mentioned process parameter, there suitable solidification zones at the welding seam end result in the case of welding of steel employed conventionally in automobile construction.

BRIEF DESCRIPTION OF THE DRAWINGS

The invention is further illustrated in the drawing, wherein.

Figure 1:
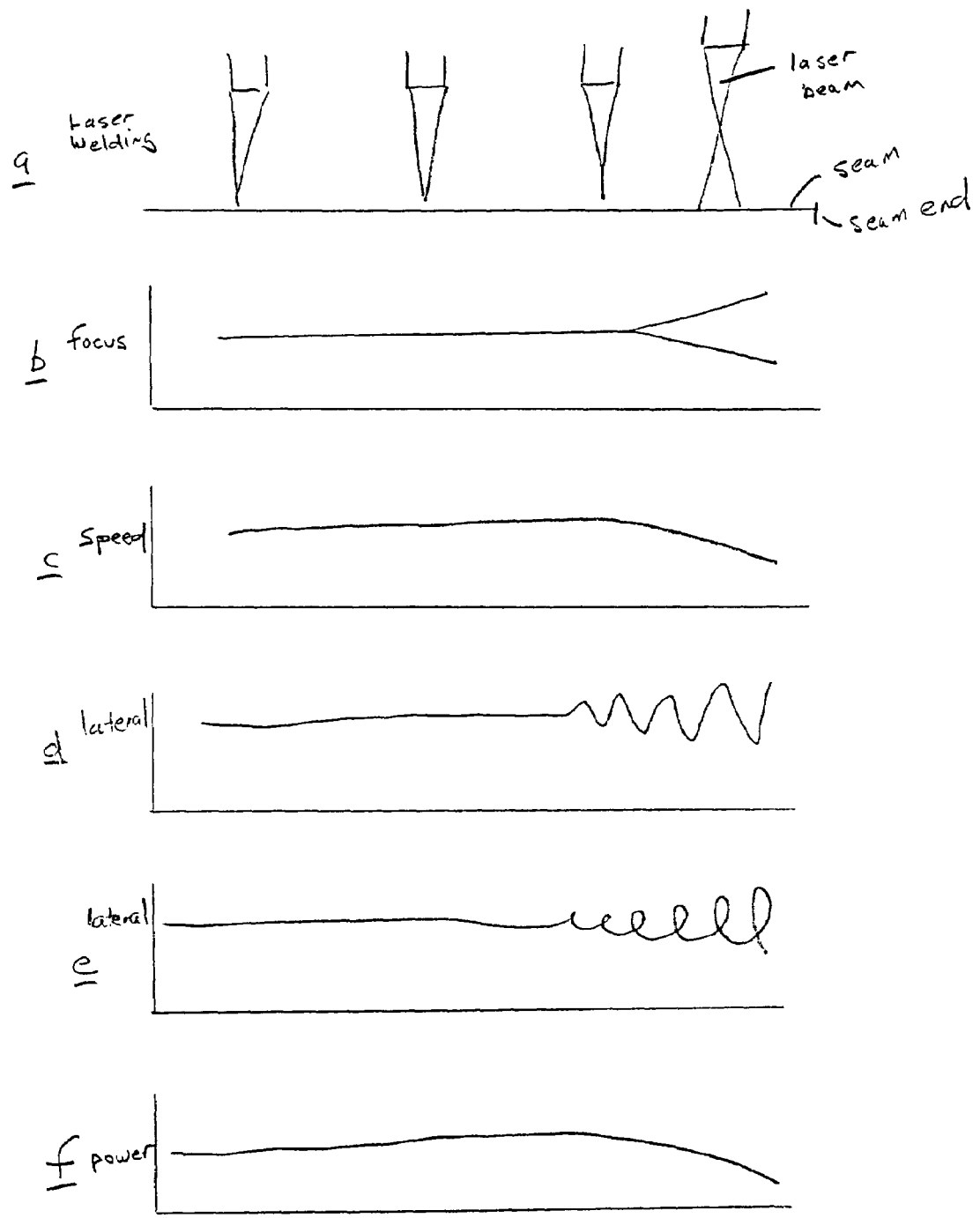
FIG. 1(a) illustrates the process of laser welding at four intervals moving from left to right.
FIG. 1(b) schematically illustrates defocusing as the focus of the laser beam is distanced from the weld.
FIG. 1(c) graphically shows reduction in speed as the laser beam approaches the seam end.
FIGS. 1(d)–(e) show lateral movement of the beam as the laser beam approaches the seam end.
FIG. 1(f) graphically show reduction in speed as the laser beam approaches the seam end.

The inventive process is however likewise suitable for welding other metals or also for plastics.

DETAILED DESCRIPTION OF THE INVENTION

In the following the inventive process will be described in greater detail on the basis of illustrative embodiments:

In a first illustrative embodiment steel sheet metal is arranged, and a scanner device is moved evenly thereover deflecting a laser beam over the surface being processed. The scanner device is comprised of a three-dimensional pivotable computer controlled mirror system. The scanner device has approximately 300 mm separation from the surface of the sheet metal, the laser focal point is located on the surface to be welded. Approximately 3 mm before reaching the programmed seam end the focus of the laser beam is distanced from the surface being processed in such a manner that the surface area illuminated by the laser beam increases linearly and incorporates at the seam end a processing surface area equal to approximately another 100% of the focus area. In synchrony with the removal of the focus from the surface, the weld speed is reduced in such a manner that it has, at the seam end, approximately 50% of the original speed of approximately 15 meters per minute. During all of this the laser output remains constant at 1700 Watt.

In a second illustrative embodiment there additionally occurs a local beam movement extending laterally beyond the seam in the form of a circular movement extending transverse to the seam about the center of the seam end. Approximately 3 mm before the seam end the laser beam is so controlled, that the center of the processing surface describes a circular movement about the center of the previous process surface. This circular movement is superimposed upon a component transverse to the seam in the direction of the programmed seam end, so that a coil or helix movement results in the direction of the seam end along a line which is a continuation of the existing seam. The coil has a radius of approximately 1 mm, which however is not achieved suddenly, but rather rapidly increasing. The number of the coils is between 3 and 10, ideally however 5 to 6 revolutions. The laser beam runs through the total coil movement in approximately 70 ms.

In a third illustrative embodiment, approximately 2.5 mm before the seam end the laser output is reduced continuously from 2000 Watt to 500 Watt at the seam end. In synchrony therewith, the welding speed of 5 meter per minute is reduced to 3 meter per minute.

In a fourth and fifth illustrative embodiment there occurs, alternatively to the reduction of the weld speed or, as the case may be, additionally, a laterally projecting local beam movement beyond the seam in the above-described spiral shape. At the same time the laser output is reduced from 1200 to 200 Watt. This process takes, depending upon the diameter of the spiral, between 35 and 70 ms.

In a sixth illustrative embodiment there occurs additionally a defocusing of the laser beam in such a manner that the processing surface increases by maximally 100%.

The inventive process has proven itself in the illustrative embodiments of the above-described examples as particularly suited for the laser beam welding of steel sheet metal in the automobile industry.

In particular, a significant reduction of end crater formation can be achieved therewith, as a result of which the mechanical characteristics of the weld seam can be significantly improved. By the employment of a laser scanner, additional substantial advantages can be achieved with respect to the processing time and precision.

The invention is not limited to the above-described illustrative embodiments, but rather is broadly applicable.

The distance of the scanner device from the surface, the laser output, the weld speed, the shape or type of the lateral beam movement and the degree of the defocusing are not necessarily constrained by the above-mentioned limitations and illustrated examples, but rather can be adapted as desired, drawing on the skill of the ordinary technician, for example adapting to the particular material being welded. This applies in particular to the laser welding of plastic as described for example in Konstruktionspraxis (Construction Technology) September 2002, pages 88–89.

The invention claimed is:

1. A process for laser beam welding with reduced formation of end craters, comprising
    moving a laser beam along a segment to be welded to form a weld seam having an end, and
    as the laser beam approaches the seam end, distancing the focus of the laser beam from the surface to be welded, wherein at least one of
    (a) the welding speed is reduced towards the seam end, and
    (b) at the seam end a local beam movement occurs sideways beyond the seam.

2. The process according to claim 1, wherein said laser welding is carried out with a laser scanner.

3. The process according to claim 1, wherein the width of the lateral beam movement laterally to the weld seam is 1 to 5 mm to each side.

4. A process for laser beam welding with reduced formation of end craters, comprising
    moving a laser beam along a segment to be welded to form a weld seam having an end, and
    as the laser beam approaches the seam end, distancing the focus of the laser beam from the surface to be welded,
    wherein at the seam end a local beam movement occurs sideways beyond the seam, and
    wherein the local beam movement is in the shape of
    (a) a decreasing spiral narrowing around the center of the seam end, or
    (b) a circular movement or gyration superimposed transverse to the seam about the center of the seam end.

5. A process for laser beam welding with reduced formation of end craters, comprising
    moving a laser beam along a segment to be welded to form a weld seam having an end, and
    as the laser beam approaches the seam end, distancing the focus of the laser beam from the surface to be welded,
    wherein the defocusing of the laser beam occurs along a linear progression.

6. A process for laser beam welding with reduced formation of end craters, comprising
 moving a laser beam along a segment to be welded to form a weld seam having an end, and
 as the laser beam approaches the seam end, distancing the focus of the laser beam from the surface to be welded, wherein at least one of
 (a) the welding speed is reduced towards the seam end, and
 (b) at the seam end a local beam movement occurs sideways beyond the seam, and
 wherein the seam segment within which the speed or focus is varied, or in which the sideways beam movement occurs, has a length of 2 to 5 mm.

7. The process according to claim 6, wherein within the seam segment the laser output is reduced from 2000–1500 Watt to 500–0 Watt.

8. The process according to claim 6, wherein the laser beam travels along the seam segment within 50 to 100 ms.

9. A process for laser beam welding with reduced formation of end craters, comprising moving a laser beam along a segment to be welded to form a weld seam having an end, wherein the laser beam power is reduced at the seam end, and wherein at least one of
 (a) the welding speed is reduced towards the seam end,
 (b) a beam movement occurs projecting locally laterally beyond the seam, and
 (c) towards the seam end the focus of the laser beam is distanced from the surface to be welded.

10. The process according to claim 9, wherein the width of the lateral beam movement laterally to the weld seam is 1 to 5 mm to each side.

11. A process for laser beam welding with reduced formation of end craters, comprising moving a laser beam along a segment to be welded to form a weld seam having an end, wherein the laser beam power is reduced at the seam end, wherein a beam movement occurs projecting locally laterally beyond the seam, and wherein the local beam movement is in the shape of
 (a) a decreasing spiral narrowing around the center of the seam end, or
 (b) a circular movement or gyration superimposed transverse to the seam about the center of the seam end.

12. The process according to claim 11, wherein said laser welding is carried out with a laser scanner.

13. A process for laser beam welding with reduced formation of end craters, comprising moving a laser beam along a segment to be welded to form a weld seam having an end, wherein the laser beam power is reduced at the seam end, and wherein towards the seam end the focus of the laser beam is distanced from the surface to be welded, wherein the defocusing of the laser beam occurs along a linear progression.

14. A process for laser beam welding with reduced formation of end craters, comprising moving a laser beam along a segment to be welded to form a weld seam having an end, wherein the laser beam power is reduced at the seam end, and wherein at least one of
 (a) the welding speed is reduced towards the seam end,
 (b) a beam movement occurs projecting locally laterally beyond the seam, and
 (c) towards the seam end the focus of the laser beam is distanced from the surface to be welded,
 wherein the terminal seam segment within which the power, speed or focus is varied, or in which the lateral beam movement occurs, has a length of 2 to 5 mm.

15. The process according to claim 14, wherein within the seam segment the laser output is reduced from 2000–1500 Watt to 500–0 Watt.

16. The process according to claim 14, wherein the laser beam travels through the seam segment within 50 to 100 ms.

* * * * *